United States Patent
Miyasaka

(10) Patent No.: US 7,612,831 B2
(45) Date of Patent: Nov. 3, 2009

(54) GAMMA CORRECTION DEVICE, IMAGE CONVERSION APPARATUS USING THE SAME, AND DISPLAY DEVICE

(75) Inventor: Daigo Miyasaka, Tokyo (JP)

(73) Assignee: NEC Corporation (JP)

( * ) Notice: Subject to any disclaimer, the term of this patent is extended or adjusted under 35 U.S.C. 154(b) by 795 days.

(21) Appl. No.: 11/378,478

(22) Filed: Mar. 20, 2006

(65) Prior Publication Data

US 2006/0215047 A1 Sep. 28, 2006

(30) Foreign Application Priority Data

Mar. 25, 2005 (JP) ............................. 2005-090032

(51) Int. Cl.
*H04N 5/202* (2006.01)
(52) U.S. Cl. ..................................... 348/674
(58) Field of Classification Search ................ 348/674, 348/675, 254; 358/519; 345/601, 602; *H04N 5/202, H04N 9/69*
See application file for complete search history.

(56) References Cited

U.S. PATENT DOCUMENTS 6,166,781 A * 12/2000 Kwak et al. ................. 348/674
7,372,507 B2 * 5/2008 Ikeda et al. ................. 348/674

FOREIGN PATENT DOCUMENTS

| JP | HEI 6-6733 | 1/1994 |
|---|---|---|
| JP | 2000-148442 | 5/2000 |
| JP | 3071131 | 5/2000 |
| JP | 2003-288060 | 10/2003 |

* cited by examiner

*Primary Examiner*—Sherrie Hsia
(74) *Attorney, Agent, or Firm*—Dickstein, Shapiro, LLP.

(57) ABSTRACT

There are provided a gamma correction device enabling correct gamma correction while reducing the capacity of a lookup table, an image conversion apparatus and a display device using the same. A gamma correction device for outputting, as an m-bit signal, a digital input signal having been inputted as an n-bit signal, m being a given number, the gamma correction device including a high-order LUT, a low-order LUT, a difference LUT, a data connecting section 2, and an adder 3, wherein each of the lookup tables has input bits fewer than n and output bits fewer than m, the high-order LUT has x-bit input and m1-bit output, the low-order LUT has (n−t)-bit input and m2-bit output, the difference LUT has (n−t)-bit input and k-bit output, $m \leq m1+m2$, $x < n-t$ and $m \geq m1+k$ are established, the data connecting section 2 outputs connection data obtained by connecting output bits of the high-order LUT on the high-order bit side and output bits of the difference LUT on the low-order bit side with $m-m1-k$ bits of "0" being interposed between the output bits, and the adder 3 adds the connection data and the output value of the low-order LUT and outputs the added data.

26 Claims, 16 Drawing Sheets

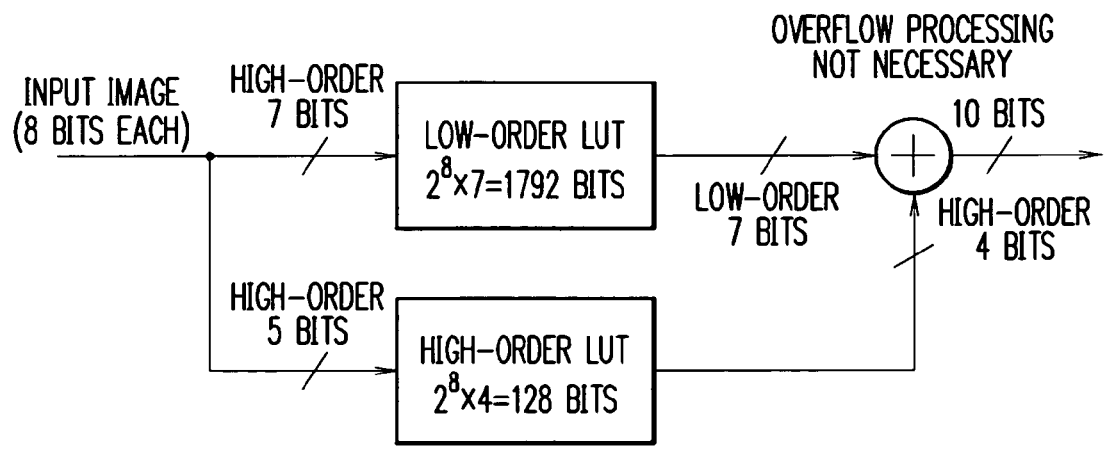
F I G. 2

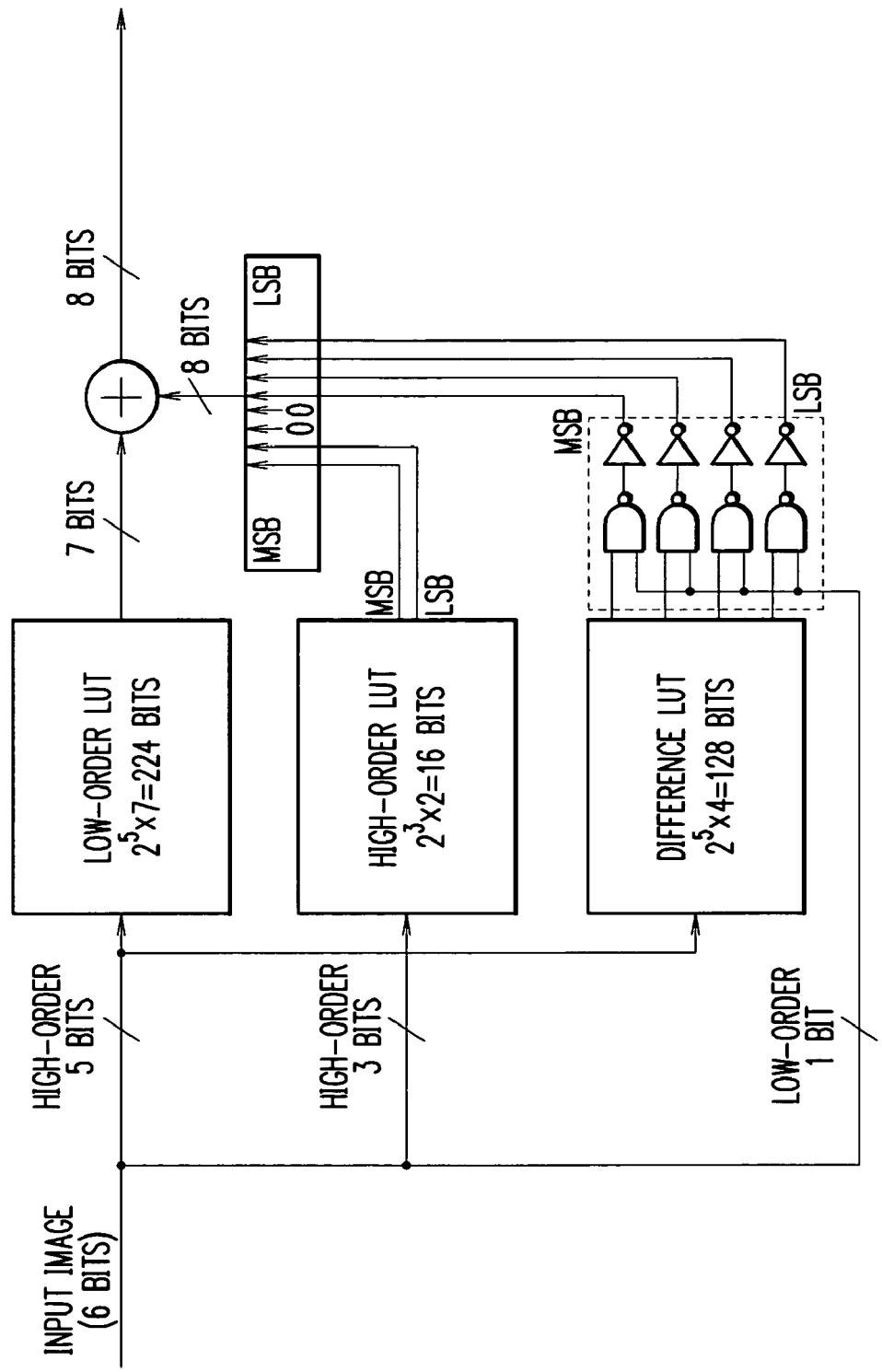
F I G. 5

F I G. 6
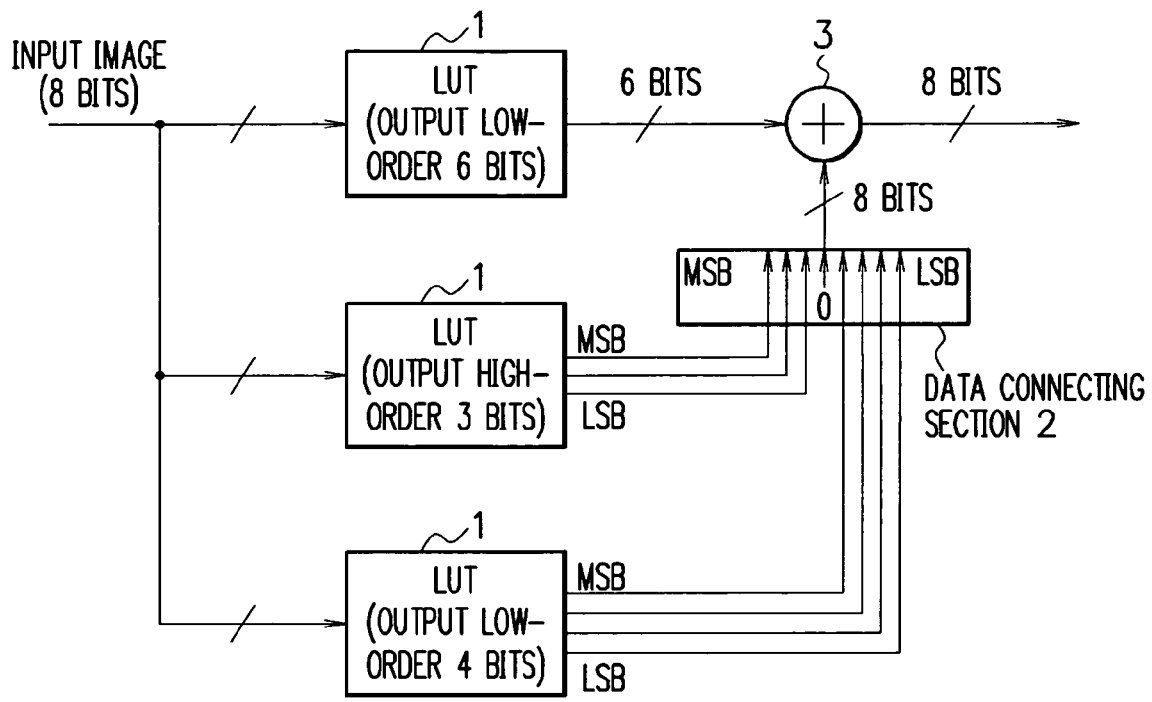

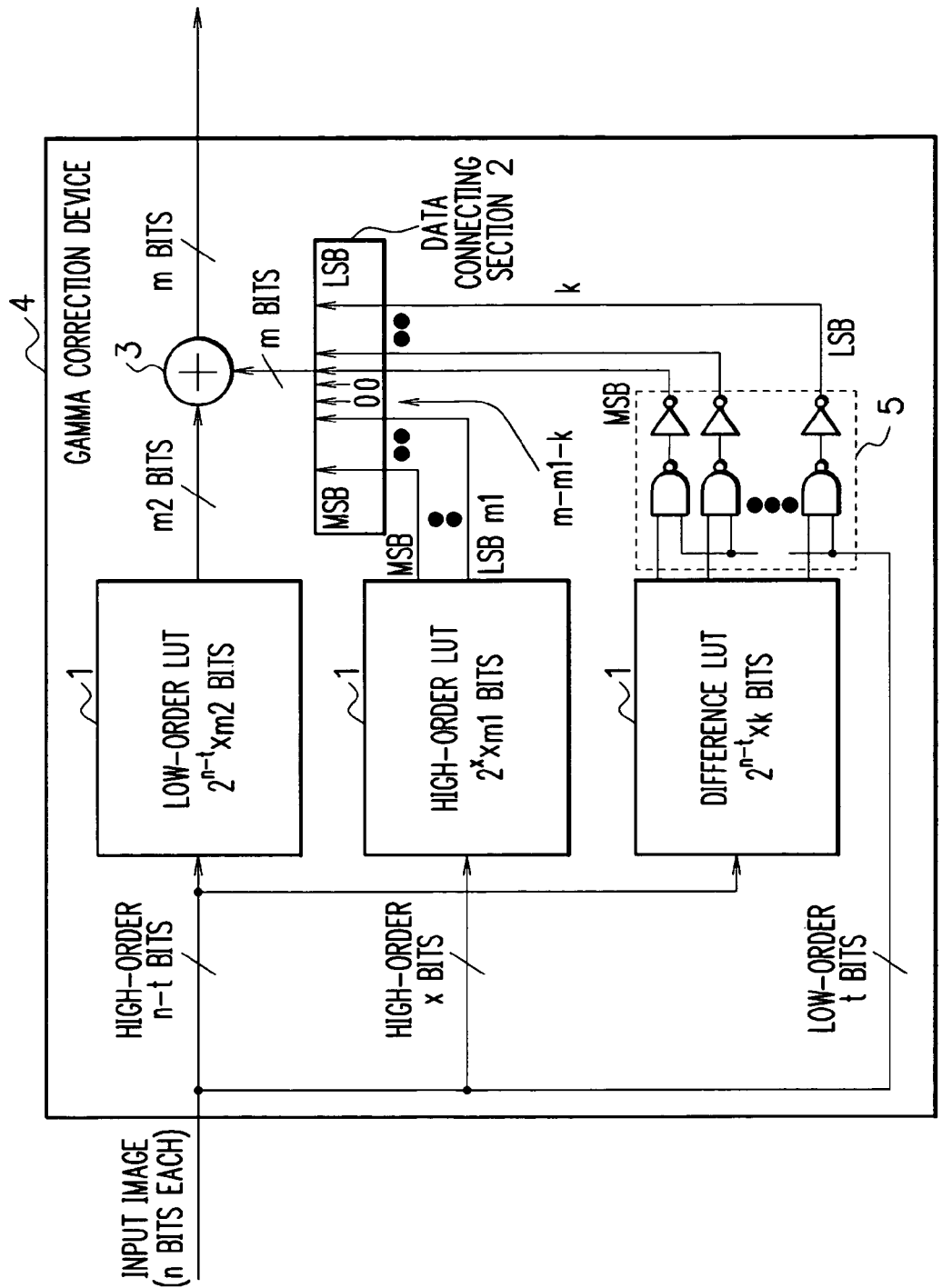
F I G. 7

FIG. 10

| INPUT GRAY SCALE | OUTPUT GRAY SCALE |
|---|---|
| 0 | 0 |
| 1 | 2 |
| 2 | 4 |
| 3 | 7 |
| 4 | 9 |
| 5 | 12 |
| 6 | 14 |
| 7 | 17 |
| 8 | 20 |
| 9 | 24 |
| 10 | 27 |
| 11 | 30 |
| 12 | 34 |
| 13 | 37 |
| 14 | 41 |
| 15 | 44 |
| 16 | 48 |
| 17 | 51 |
| 18 | 55 |
| 19 | 59 |
| 20 | 63 |
| 21 | 67 |
| 22 | 70 |
| 23 | 74 |
| 24 | 78 |
| 25 | 82 |
| 26 | 86 |
| 27 | 91 |
| 28 | 95 |
| 29 | 99 |
| 30 | 103 |
| 31 | 107 |
| 32 | 111 |
| 33 | 116 |
| 34 | 120 |
| 35 | 124 |
| 36 | 129 |
| 37 | 133 |
| 38 | 137 |
| 39 | 142 |
| 40 | 146 |
| 41 | 151 |
| 42 | 155 |
| 43 | 160 |
| 44 | 164 |
| 45 | 169 |
| 46 | 174 |
| 47 | 178 |
| 48 | 183 |
| 49 | 188 |
| 50 | 192 |
| 51 | 197 |
| 52 | 202 |
| 53 | 206 |
| 54 | 211 |
| 55 | 216 |
| 56 | 221 |
| 57 | 226 |
| 58 | 230 |
| 59 | 235 |
| 60 | 240 |
| 61 | 245 |
| 62 | 250 |
| 63 | 255 |

FIG. 11

| INPUT VALUE | HIGH-ORDER LUT | LOW-ORDER LUT | DIFFERENCE LUT |
|---|---|---|---|
| 0 | 0 | 0 | 2 |
| 1 | 0 | 4 | 3 |
| 2 | 0 | 9 | 3 |
| 3 | 1 | 14 | 3 |
| 4 | 1 | 20 | 4 |
| 5 | 2 | 27 | 3 |
| 6 | 2 | 34 | 3 |
| 7 | 3 | 41 | 3 |
| 8 | | 48 | 3 |
| 9 | | 55 | 4 |
| 10 | | 63 | 4 |
| 11 | | 70 | 4 |
| 12 | | 14 | 4 |
| 13 | | 22 | 5 |
| 14 | | 31 | 4 |
| 15 | | 39 | 4 |
| 16 | | 47 | 5 |
| 17 | | 56 | 4 |
| 18 | | 65 | 4 |
| 19 | | 73 | 5 |
| 20 | | 18 | 5 |
| 21 | | 27 | 5 |
| 22 | | 36 | 5 |
| 23 | | 46 | 4 |
| 24 | | 55 | 5 |
| 25 | | 64 | 5 |
| 26 | | 74 | 4 |
| 27 | | 83 | 5 |
| 28 | | 29 | 5 |
| 29 | | 38 | 5 |
| 30 | | 48 | 5 |
| 31 | | 58 | 5 |

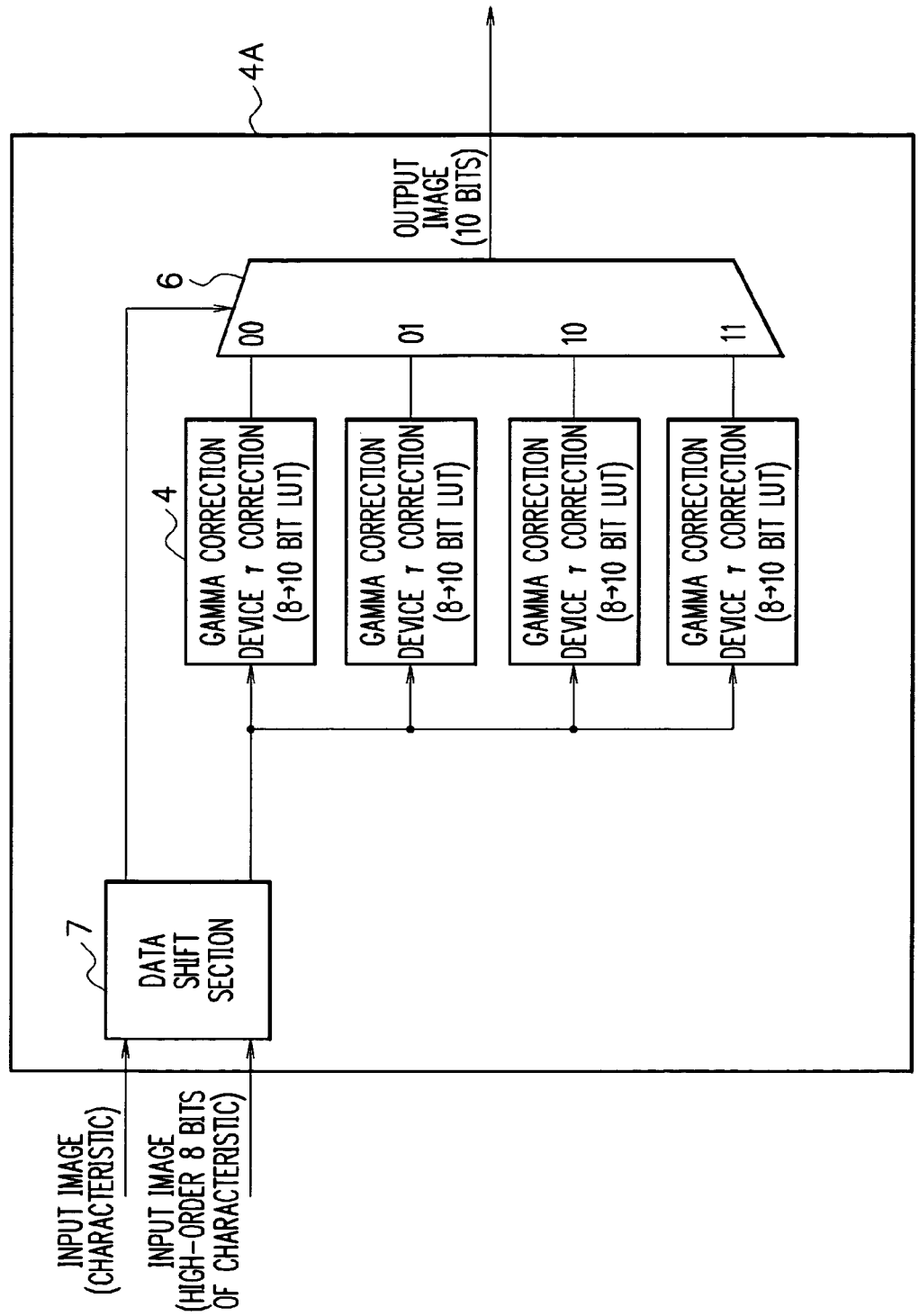

GAMMA CORRECTION DEVICE, IMAGE CONVERSION APPARATUS USING THE SAME, AND DISPLAY DEVICE

BACKGROUND OF THE INVENTION

The present invention relates to a gamma correction device, floating-point gamma correction device, an image conversion apparatus using the circuit of the device, and a display device, and particularly relates to a miniaturized gamma correction device, a floating-point gamma correction device, an image conversion apparatus, and a display device.

DESCRIPTION OF RELATED ART

Display devices including a cathode ray tube (CRT), a liquid crystal display (LCD) and a plasma display (PDP) have inherent gamma characteristics depending on the display device characteristics. A gamma characteristic represents the relationship between an input signal level and the output luminance of a display device. Gamma characteristics greatly vary among a CRT, an LCD and a PDP.

Input video signals such as sRGB, which is a standard color space signal for a television signal or a computer, have gamma characteristics defined by corresponding predetermined standards. "Gamma correction" is performed on input video signals to obtain those characteristics. For example, a television signal is gamma-corrected for a CRT. Therefore, when the same television signal is displayed on a LCD or a PDP, it is necessary to inversely correct the gamma characteristics of the input video signal and make a correction suitable for the LCD or PDP according to the inversely corrected input signal and the output luminance of a display device (this correction is hereinafter collectively referred to as gamma correction).

Further, in gamma correction, contrast and brightness can be corrected by changing a correction curve.

For gamma correction, an analog method and a digital method are available.

Analog gamma correction is mainly performed on an LCD. The transmittance of a pixel on an LCD is varied by changing an applied voltage. Hence, gamma correction is accomplished by changing the conversion characteristics (DA conversion characteristics) from an input signal (digital) to output voltage (analog) based on the relationship between an input signal level and the output voltage and the relationship between the output voltage and the transmittance (called V-T curve).

However, in order to set a plurality of gamma correction characteristics in analog processing, the hardware configuration has to be changed, so that the characteristics cannot be changed so flexibly. For this reason, when signals are inputted with different gamma characteristics, digital gamma correction may contribute to a simple device configuration as compared with analog processing.

Digital processing circuits can be identical in configuration in an LCD, a PDP and other kinds of display, and can be easily mounted in devices.

For digital gamma correction, lookup table (LUT) system is available in which output values corresponding to all input signals are stored in memory and then converted. In LUT system, even when signals are inputted with different gamma characteristics, arbitrary gamma correction can be performed by setting output values according to the signals.

In LUT system, however, all the output values have to be stored in memory. In the case of RGB color displays, since the output values of respective RGB have to be stored in memory, the circuit size increases. Further, it is difficult to reduce the number of bits of an output value because accuracy has to be maintained.

For this reason, methods of reducing a digital gamma correction circuit volume have been conventionally studied.

A first method for solving the problem is a combination of LUT and interpolation. In this method, an output value corresponding to an input value of high-order N bits of an M-bit input signal is stored in memory according to an LUT. Interpolation is performed using an output value corresponding to an input value X of the high-order N bits in the LUT, an output value corresponding to an input value X+1 in the LUT, and the value of low-order (M−N) bits. Thus, the memory capacity for the LUT can be considerably reduced.

In the first method, the input value of the LUT is the value of high-order M bits. A more flexible configuration is available in which an input value can have any number of bits as disclosed in Japanese Patent Application Laid-Open No. 2003-288060 (page 5, FIGS. 1 and 2) (Patent Document 1).

In a second method, the followings are stored in memory as an LUT: an output value Y corresponding to an input value X of high-order N bits of an M-bit input signal having low-order (M−N) bits of "0", and a difference D of adjacent values when the low-order (M−N) bits have values other than "0". The output value of the M-bit input signal is calculated based on the output value Y and the difference D.

For example, when the input has 4 bits, the output has 6 bits, and the relationship of input to output is 1000 to 100000, 1001 to 100011, 1010 to 101000 and 1011 to 101111, the output value Y is 100000 for input high-order 2 bits of "10" and low-order bits of "00", and output differences D (011, 101, 111) for 1001, 1010, and 1011 are stored in the LUT. Thus, an output value for an input value of 1011 is determined by Y+ρD=100000+011+101+111=101111. In this case, the memory capacity of the output differences D is reduced from 6 bits to 3 bits, thereby reducing the circuit size.

Further, Japanese Patent Application Laid-Open No. 2000-148442 (pages 4 and 9, FIGS. 3 and 10) (Patent Document 2) discloses a configuration in which high-speed processing can be performed in a more software manner by devising a data storage method.

In a third method, the followings are stored in memory as an LUT: an output value Y corresponding to an input value X of high-order N bits of an M-bit input signal, and a difference D between the output value Y and an output obtained for the input value X of the high-order N bits and low-order (M−N) bits of values other than "0". An output value corresponding to the M-bit input signal is calculated based on the output value Y and the difference D.

Conventional arts using such a configuration are disclosed in Japanese Patent Application Laid-Open No. HEI 6-6733 (page 3, FIG. 2) (Patent Document 3) and Japanese Patent No. 3071131 (page 2, FIG. 1) (Patent Document 4). The invention disclosed in Patent Document 3, when a plurality of gamma correction values are necessary, takes advantage of a small difference between the gamma correction values. The configuration of the invention comprises a first gamma correction circuit for outputting high-order correction values and a second gamma correction circuit for outputting a plurality of low-order correction values. According to Patent Document 4, the above configuration is included in a part of a circuit.

SUMMARY OF THE INVENTION

In the first method, the circuit size is reduced but output values cannot be arbitrarily set for all the input values because of interpolation. Further, interpolation calculation is linear in most cases and thus accuracy decreases in the case of a complicated correction curve. Interpolation of second order or higher increases the size of a circuit for an operation, which makes the interpolation less advantageous. Further, the complicated operation interferes with high-speed processing.

In the second method, it is necessary to add output differences and representative values two or more times. The larger low-order (M−N) bits become, the smaller the circuit size of the LUT could be. However, an adder becomes larger and thus high-speed processing cannot be performed. Moreover, when the number of bits of the output difference is not so smaller than the number of output bits of Y, the circuit size cannot be sufficiently reduced even the values of (M−N) bits is increased.

Regarding the third method, the invention disclosed in Patent Document 3 is not applicable unless the high-order bits of two or more LUTs can be collectively handled. Particularly in the case of an LCD, high-order bits not collectively handled result in a large difference between RGB output values and thus the invention may not be applicable in some operation modes. In the invention disclosed in Patent Document 4, interpolation is performed over the circuit and thus causes the same problem as the first method. Further, Patent Document 4 does not mention that only an LUT could be extracted and independently used.

In any case, a desired gamma correction circuit is: that is applicable when a large difference exists between RGB output values, the use of the adder should be minimized because the circuit size only including an LUT is not sufficiently larger than the circuit size of an adder; high versatility is obtained to have a correct output value even from a complicated correction curve; and high-speed processing can be performed with a simple operation. Particularly a gamma correction circuit used for a mobile computing device requires the above characteristics.

The present invention is devised in view of the foregoing problems. It is an object of the present invention to provide a gamma correction device enabling accurate gamma correction while reducing the capacity of a lookup table, an image conversion apparatus using the same, and a display device.

In order to attain the object, the invention provides as a first aspect of the present invention, a gamma correction device for outputting, as an m-bit signal, a digital input signal having been inputted as an n-bit signal, m being a given number, the gamma correction device comprising a first lookup table, a second lookup table, a third lookup table, a connector, and an adder, wherein each of the lookup tables has input bits fewer than n and output bits fewer than m, the first lookup table has x-bit input and m1-bit output, the second lookup table has (n−t)-bit input and m2-bit output, the third lookup table has (n−t)-bit input and k-bit output, $m \leqq m1+m2$, $x<n-t$ and $m \geqq m1+k$ are established, the connector outputs connection data obtained by connecting output bits of the first lookup table on the high-order bit side and output bits of the third lookup table on the low-order bit side with m−m1−k bits of "0" being interposed between the output bits, and the adder adds the connection data and the output value of the second lookup table and outputs the added data.

According to the first aspect of the present invention, it is more preferable to provide the plurality of third lookup tables. Alternatively the following configuration is preferable: when the relationship between n-bit input and m-bit output is set in gamma correction as a base input/output table, an input/output table in the first lookup table sets, as an output value (as a reference value signal) for an x-bit input value of IN1, the high-order m1 bits of an output value corresponding to an input value having high-order x bits of IN1 and low-order n−x bits of 0 on the base input/output table, an input/output table in the second lookup table sets, as an output value for an (n−t) bit input value of IN2, a difference between an output value corresponding to an input value having high-order n−t bits of IN2 and low-order t bits of 0 on the base input/output table and a value obtained by adding an output value corresponding to an input value having high-order x bits of IN2 and low-order bits of m−m1 "0" on the first lookup table, and an input/output table in the third lookup table sets, as an output value for an (n−t)-bit input value of IN3, a difference between an output value corresponding to an input value having high-order (n−t) bits of IN3 and low-order t bits other than 0 on the base input/input output table and an output value corresponding to an input value having high-order n−t bits of IN3 and low-order t bits of 0 on the base input/output table.

In any one of the configurations of the first aspect of the present invention, the third lookup table has k output bits and k is preferably determined based on a correction value γ of gamma correction. Alternatively, the third lookup table has k output bits and k is preferably set based on the maximum difference between adjacent gray scales in brightness/contrast correction.

Moreover, in order to attain the object, a second aspect of the present invention provides a floating-point gamma correction device for outputting an m-bit input signal made up of an exponent and a significand, comprising as integer gamma correction units the plurality of gamma correction devices according to any one of the configurations of the first aspect of the present invention, wherein the integer gamma correction unit has, as input, the high-order n bits of the exponent, and gamma correction with n-bit input and m-bit output is performed by selecting one of the outputs of the integer gamma correction units based on the value of the significand, the selected output being determined based on the value of the exponent.

Further, in order to attain the object, a third aspect of the present invention provides an image conversion apparatus comprising the gamma correction device according to any one of the configurations of the first aspect of the present invention or the floating-point gamma correction device according to the second aspect of the present invention.

Further, in order to attain the object, a fourth aspect of the present invention provides an image display device comprising the gamma correction device according to any one of the configurations of the first aspect of the present invention or the floating-point gamma correction device according to the second aspect of the present invention.

According to the present invention, it is possible to provide a gamma correction device and a floating-point gamma correction device which enable correct gamma correction while reducing the capacity of a lookup table, an image conversion apparatus using the same, and a display device.

BRIEF DESCRIPTION OF THE DRAWINGS

The objects and features of the present invention will become more apparent from the consideration of the following detailed description taken in conjunction with the accompanying drawings, in which:

FIG. 2 is a diagram showing the configuration of a gamma correction circuit comprising the high-order LUT and the low-order LUT;

FIG. 5 is a diagram showing another structural example of the gamma correction circuit comprising the high-order LUT, the low-order LUT, and the difference LUT;

FIG. 6 is a diagram showing the principle of the present invention;

FIG. 7 is a diagram showing the configuration of the gamma correction circuit in which the number of input/output bits is any given value;

FIG. 10 is a diagram showing the input/output values of the gamma correction circuit when a 6-bit input signal has a γ value of 2.2 and a bit output signal has a γ value of 1.8;

FIG. 11 is a diagram showing the configuration of the high-order LUT, the low-order LUT, and the difference LUT of the gamma correction circuit according to Embodiment 1;

FIG. 16 is a diagram showing the configuration of a gamma correction circuit according to Embodiment 3.

DESCRIPTION OF THE PREFERRED EMBODIMENTS

Principle of the Invention

In order to perform gamma correction without image degradation, all gray scales have to be finely adjusted in a separated manner. Thus, linear interpolation cannot be used and LUTs corresponding to all input gray scales are necessary.

As described in the second conventional method, when the memory size of a gamma correction device is reduced, an LUT is divided or more LUTs are set to reduce the number of output bits (including an output difference D). Further, as described in the third conventional method, an LUT may be divided or more LUTs may be set to reduce the number of input bits. However, the more divided an LUT is, the more adders or subtractors are necessary to calculate the LUTs, weakening the effect of a circuit size having been reduced by dividing the LUT.

Moreover, the more adders are connected serially, the lower the processing speed becomes, which raises a problem in a gamma correction device which handles a video signal of a high operating frequency.

The inventors studied a method of reducing a circuit size of LUT system and found that the memory capacity of an LUT can be reduced and an increase in the circuit size of peripheral circuits (adder) other than memory can be minimized by combining two methods described below.

The following will discuss an LUT with 8-bit input and 10-bit output. The LUT configured thus has $2^8 \times 10 = 2560$ bits.

<1> Input gray scale is divided into segments of high-order bits and an offset value is set for each divided segment. Then, a difference from the offset is stored as an LUT value.

Figure 1:
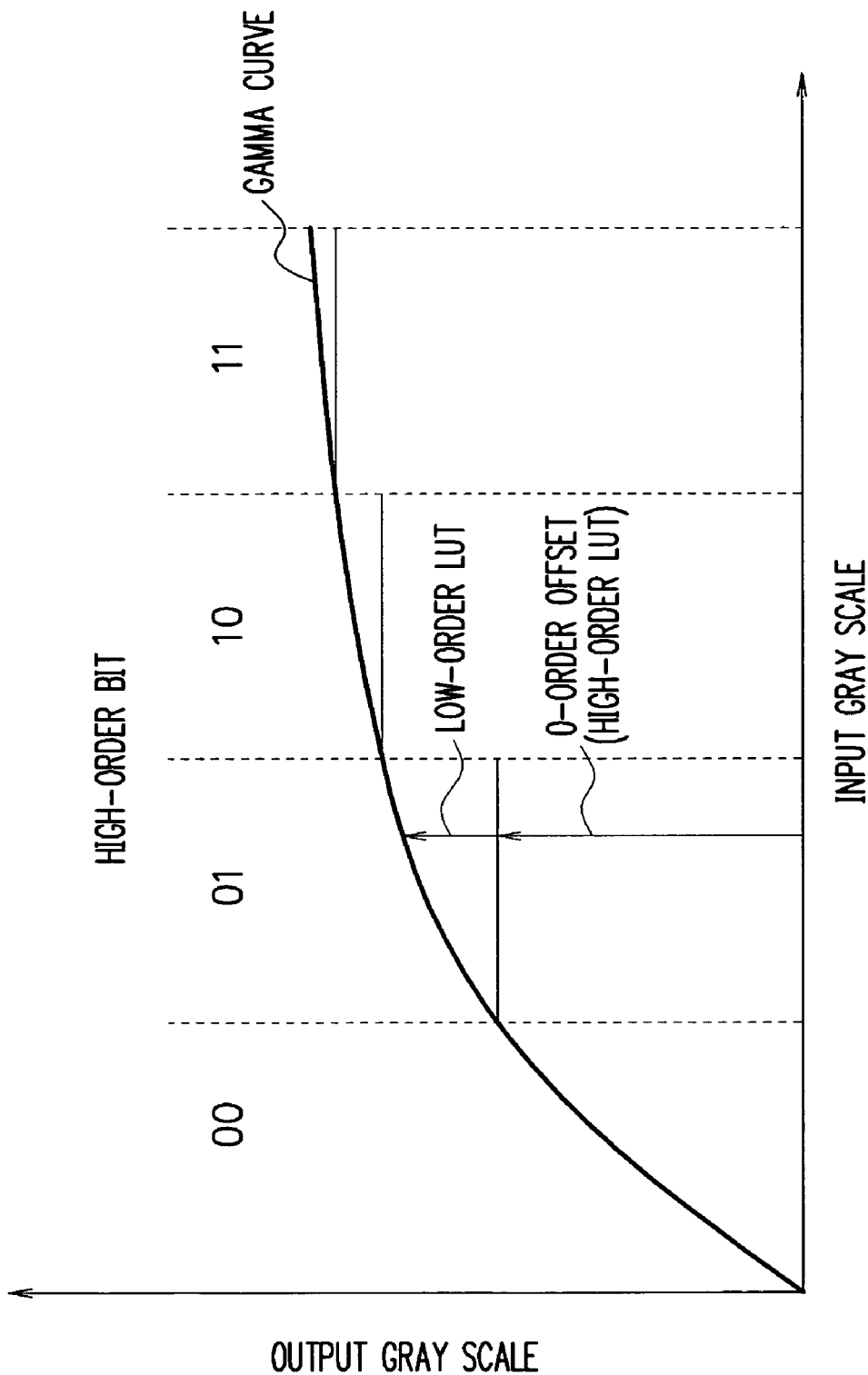
FIG. 1 is a diagram showing the relationship among input/output gray scales, a high-order LUT, and a low-order LUT.

As shown in FIG. 1, a segment is made every time the high-order bit is changed and the minimum value in the segment is set as an offset. The offset is configured according to an LUT having input of high-order bits (high-order LUT). Thus, it is possible to reduce the maximum value of the LUT (low-order LUT) for storing differences, thereby reducing the number of output bits. FIG. 2 shows a combination of the high-order LUT and the low-order LUT.

The division into the high-order LUT and the low-order LUT only requires an additional adder, so that the overall circuit size is reduced. The number of input/output bits of the high-order LUT and the number of output bits of the low-order LUT are set so as to respond to γ values between 1 to 3 during gamma correction. The memory size of the LUT at this point is 1792+128=1920 bits, which is a capacity reduction of 25%.

<2> The low-order LUT stores only a value obtained when the lowest-order bit of input gray scale is 0. When the lowest-order bit is 1, a difference from a value having the same high-order bit and the lowest-order bit of 0 is kept as a difference LUT.

Figure 3:
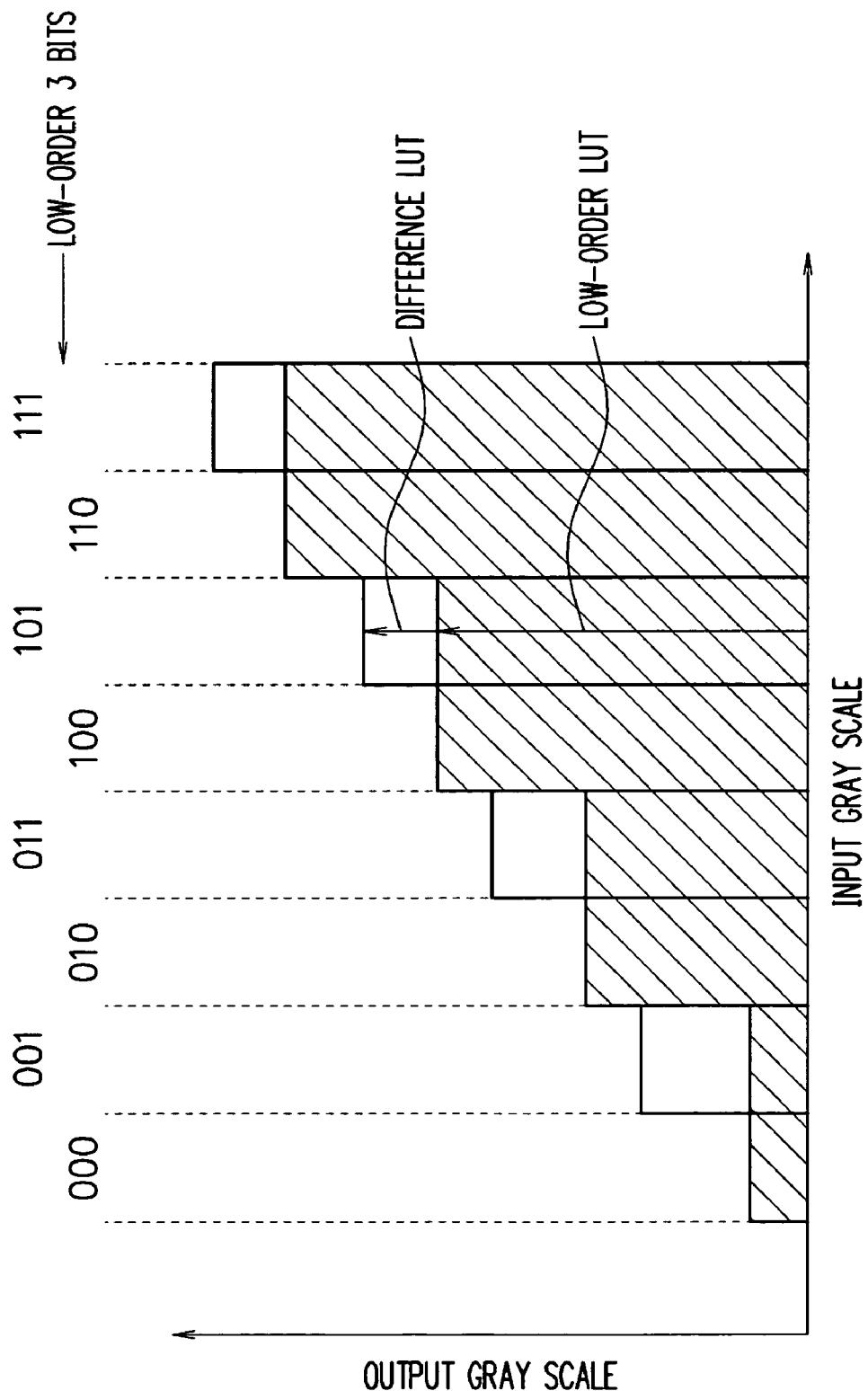
FIG. 3 is a diagram showing the relationship among input/output gray scales, a low-order LUT, and a difference LUT.
Figure 4:
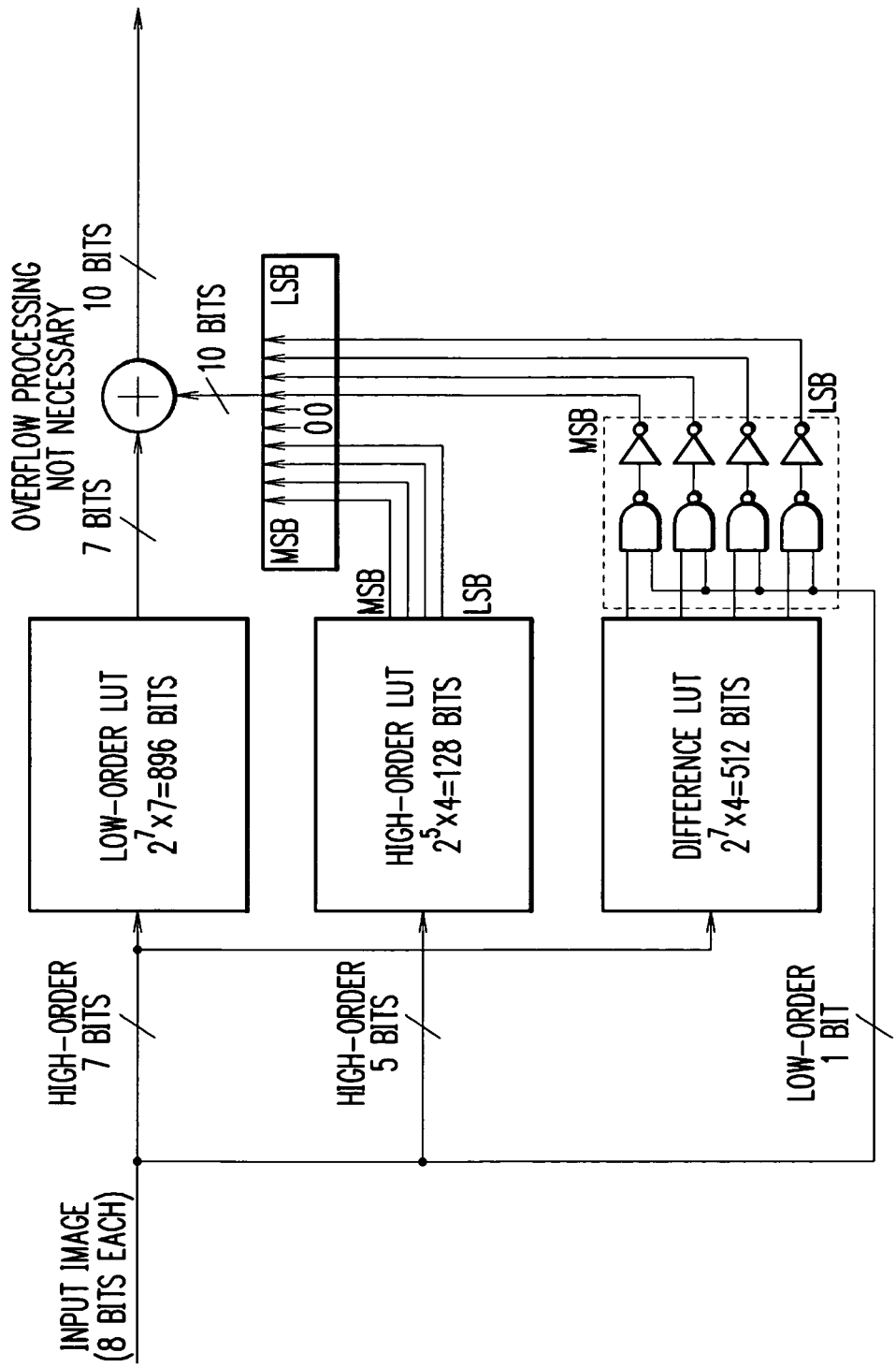
FIG. 4 is a diagram showing the configuration of a gamma correction circuit comprising a high-order LUT, a low-order LUT, and a difference LUT.

As shown in FIG. 3, when a low-order LUT having the lowest-order bit of 0 is kept, for the lowest-order bit of 1, it is only necessary to keep a difference from the lowest-order bit of 0 as a difference LUT. The division into the low-order LUT and the difference LUT can further reduce the memory capacity of the LUT. FIG. 4 shows the configuration of the LUTs. Final output is the sum of the high-order LUT, the low-order LUT and the difference LUT.

In this configuration, the high-order LUT and the difference LUT are bit-connected (connected via "0") beforehand, so that an additional adder is not necessary. In this case, the circuit size is not increased or processing speed is not reduced because no logic gate is passed.

With this configuration, the circuit size including an adder can be reduced by 35% or more from the conventional LUT.

FIG. 5 shows the configuration of a gamma correction circuit for performing gamma correction from 6 bits to 8 bits. As input bits decrease, the memory capacitor decreases by a power of 2 and thus peripheral circuits such as an adder relatively occupy a larger area in the overall circuit. In the present invention, however, only a single adder is provided and thus the circuit size can be reduced by 20% or more even in gamma correction from 6 bits to 8 bits.

As shown in FIG. 6, even when the number of input bits and the number of output bits are equal, the circuit size can be reduced in a similar manner.

Although the above explanation indicated specific numeric values as the number of input/output bits, the number of input/output bits can be arbitrarily set.

FIG. 7 shows the configuration of a gamma correction circuit for performing gamma correction with n-bit input and m-bit output. The gamma correction circuit comprises three LUTs of a low-order LUT having high-order input of (n−t) bits and low-order output of m2 bits, a difference LUT similarly having high-order input of (n−t) bits and low-order output of k bits, and a high-order LUT having high-order input of x bits and high-order output of m1 bits, a difference LUT output setting section for calculation using the output of the difference LUT and low-order input of 1 bit, a data connecting section for connecting the output of the difference LUT output setting section on LSB side and the output of the high-order LUT on MSB side with m−m1−k "0s" being interposed between the outputs, and an adder for adding the output of the data connecting section and the output of the low-order LUT.

The following will describe a method of determining m2 and k of the low-order LUT and the difference LUT in the gamma correction circuit thus configured.

Of low-order LUT values at the maximum input value in regions divided by high-order bits, m2 is determined as the number of bits capable of expressing the maximum value.

Further, of all the difference LUT values, k is generally set as the number of bits capable of expressing the maximum value. However, in the case of gamma correction expressed by $Y=X^{\wedge}\gamma$, either a difference LUT value from gray scale "0" to gray scale "1" or a difference LUT value from (maximum gray scale −1) to the maximum gray scale is the largest and thus k is determined as a value capable of expressing the difference LUT having input gray scale of 1.

Although m1 and x can be arbitrarily set, it is preferable to set m1 and x so as to minimize the data amount of the overall LUT (the total data amount of the high-order LUT, the low-order LUT, and the difference LUT). In many cases, m1 determined by relational expression of m1+m2=m+1 minimizes the memory capacity of the LUT. Further, after setting a given value as x, it is desirable to set x small enough for the number of bits of m2 not to increase.

By dividing the LUT thus, it is possible to achieve a gamma correction device in which the circuit size of a lookup table can be reduced with a single adder by dividing the lookup table, high versatility enabling the output of a correct value is achieved, and high-speed processing can be performed.

Conventionally, attention has been mostly focused on a reduction in the circuit size of an LUT. However, when the number of input/output bits is small and the LUT has a small memory size, for example, for the use of a mobile computing device, the circuit size of an adder or the like is not negligible.

The present invention is sufficiently applicable to the above use and also applicable for handling a video signal of a high operating frequency. Moreover, the circuit size can be reduced.

A gamma correction circuit based on the above principle is characterized as follows:

(1) Fine adjustment can be made independently for every gray scale (2) Gamma values between 1 to 3 can be corrected, though the gamma values cannot be dynamically changed.

The following will discuss preferred embodiments of the present invention.

Embodiment 1

The following will describe Embodiment 1 for preferably implementing the present invention.

Figure 8:
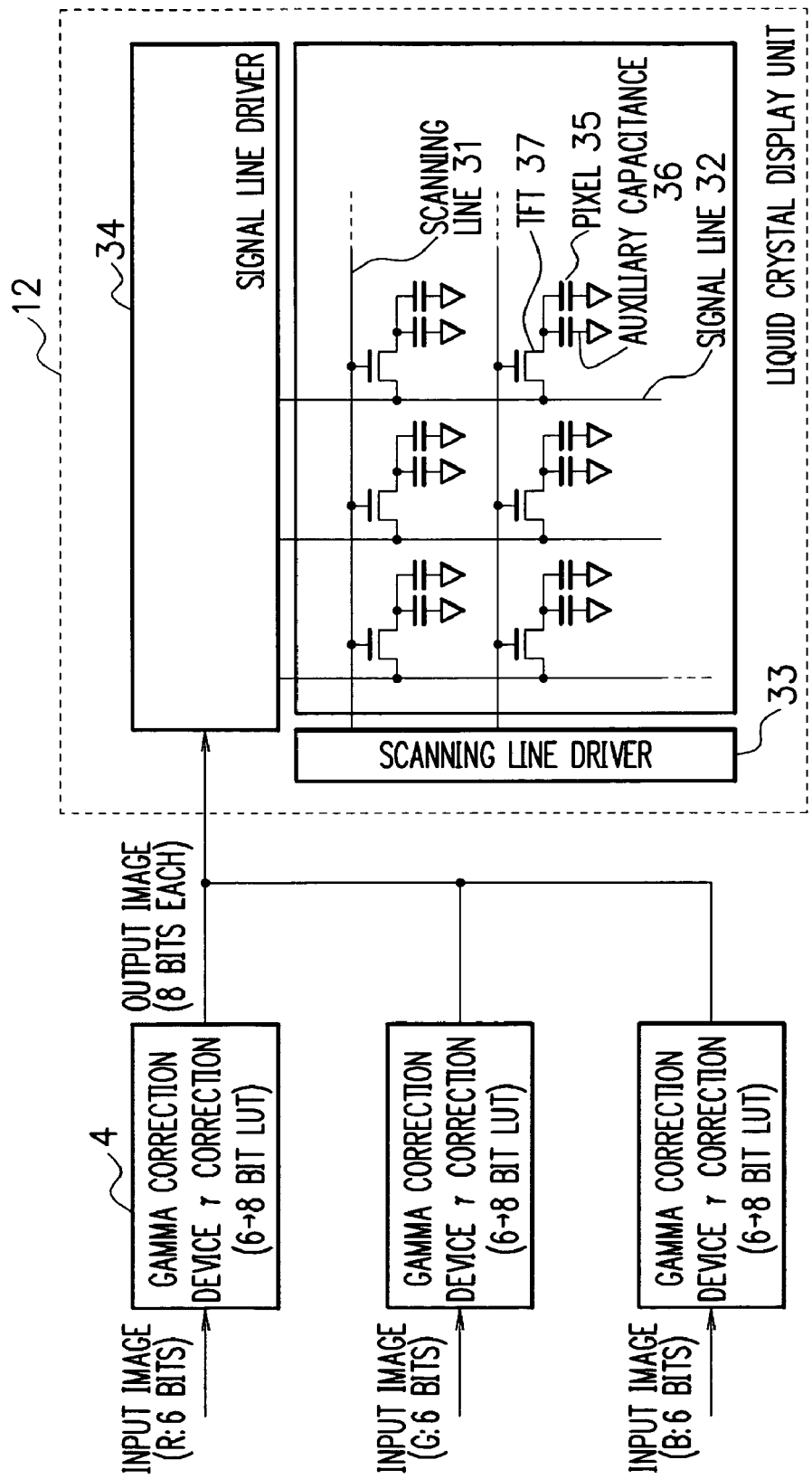
FIG. 8 is a diagram showing the configuration of an image display device using the gamma correction circuit according to Embodiment 1 for preferably implementing the present invention.
Figure 9:
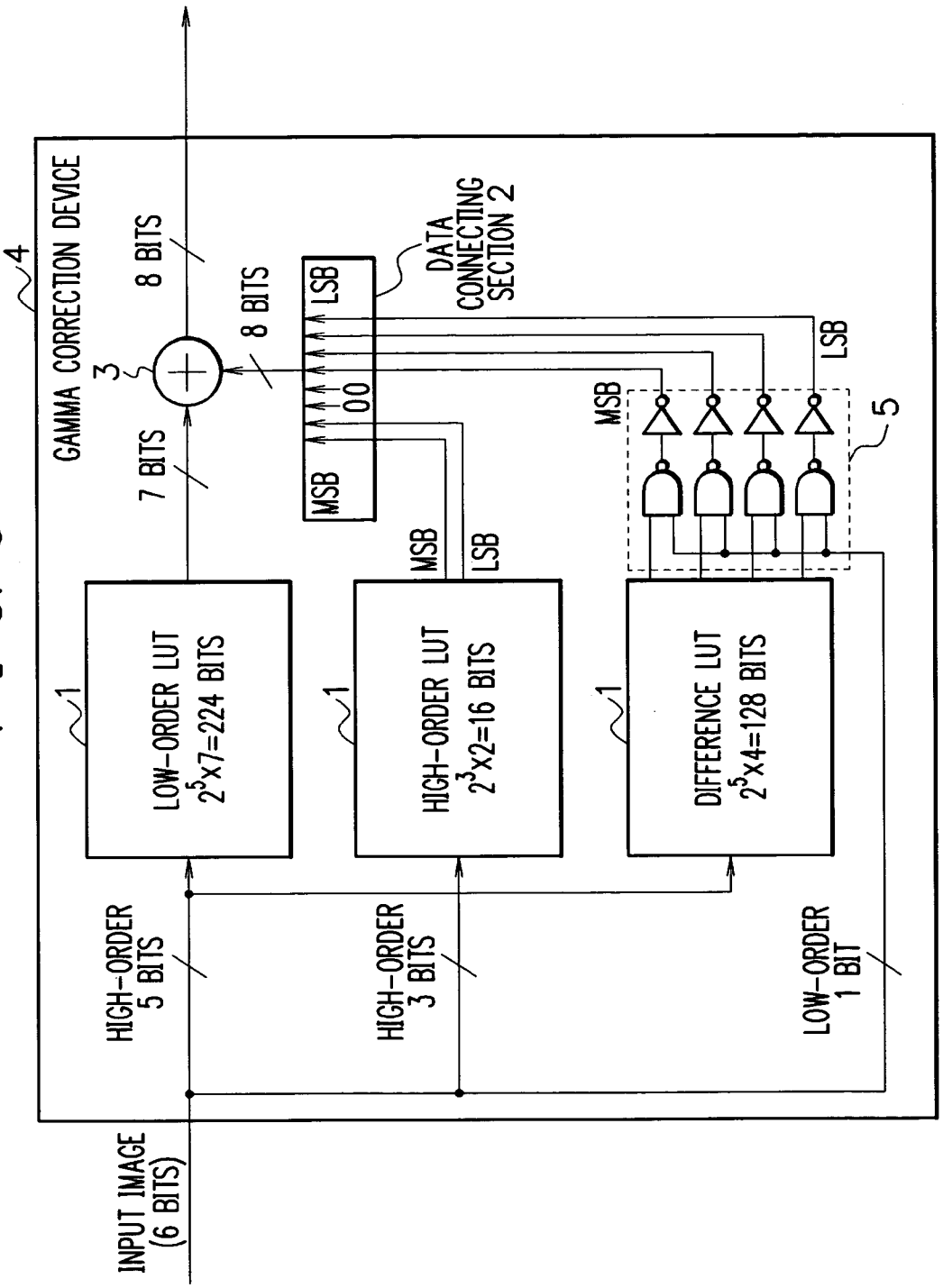
FIG. 9 is a diagram showing the configuration of the gamma correction circuit according to Embodiment 1.

FIG. 8 shows the configuration of a liquid crystal display having gamma correction devices of the present embodiment. FIG. 9 shows the configuration of the gamma correction device of the present embodiment.

For convenience, the number of bits indicating the input/output gray scale of the gamma correction device is 6 bits on RPG input and 8 bits on output. $\gamma=2.2$ is set for an input video signal and $\gamma=1.8$ is set in the liquid crystal display, so that the γ value has to be changed.

In the liquid crystal display of FIG. 8, a digital video signal (for example, 6-bit input for each color of RGB signal) is inputted to a gamma correction device 4 and the signal is outputted therefrom after gamma correction. The signal is transmitted to a liquid crystal display unit 12, the transmittance of a pixel 35 of the liquid crystal display unit 12 is determined based on the digital video signal, and an image is displayed.

The liquid crystal display unit 12 has a plurality of scanning lines 31 and signal lines 32 which intersect one another, a scanning line driver 33 for controlling signals inputted to the plurality of scanning lines 31, a signal line driver/control signal generation section 34 for controlling signals inputted to the plurality of signal lines 32, the plurality of pixels 35 disposed on the intersections of pixel rows/columns via thin-film transistors (TFT) 37 provided in a matrix form, and auxiliary capacitances 36 connected in parallel.

The following is a process from when the digital video signal is inputted until an image is displayed on the liquid crystal display unit 12. The gamma correction device 4 gamma-corrects an input digital signal and outputs a digital signal. The outputted video signal and a display control signal (not shown) are transmitted to the scanning line driver 33 and the signal line driver/control signal generation section 34. In the section 34, DA conversion is performed on the digital video signal based on conversion characteristics determined by the applied voltage-luminance characteristic of the pixel 35 of the liquid crystal display unit 12 and the gamma characteristic of the input video signal. The signal having been converted to analog voltage is applied through the TFTs 37 to the pixels 35 connected to the scanning lines 31 to which on-voltage is selectively applied by the scanning line driver 33, and then the signal is converted to luminance and outputted as an image.

Generally, the voltage of a DA converter (not shown) in the section 34 is set in the LCD on the assumption that $\gamma=2.2$ or 1.8 is set for the input video signal. In the present embodiment, $\gamma=1.8$ is set for the DA converter.

FIG. 9 shows the detailed configuration of the gamma correction device 4. The gamma correction device 4 comprises three LUTs of a low-order LUT having high-order input of 5 bits and low-order output of 7 bits, a difference LUT similarly having high-order input of 5 bits and low-order output of 4 bits, and a high-order LUT having high-order input of 3 bits and high-order output of 2 bits, a difference LUT output setting section 5 for calculation using the output of the difference LUT and the low-order input of 1 bit, a data connecting section 2 for connecting the output of the difference LUT output setting section 5 on LSB side and the output of the high-order LUT on MSB side with "00" being interposed between the outputs, and an adder 3 for adding the output of the data connecting section 2 and the output of the low-order LUT. The output of the adder 3 is transmitted to the liquid crystal display unit 12.

In the gamma correction device of FIG. 9, a memory capacity required for storing the LUT is reduced by dividing the LUT using the characteristic of gamma correction. Further, the size of an arithmetic circuit for calculating each LUT value and determining an output value is minimized, so that the circuit size of the overall device is reduced and a reduction in operation speed is suppressed in the overall circuit.

First, a method of setting input/output values of each LUT will be discussed below using specific values. Regarding the input/output values of the gamma correction device 4, $\gamma=2.2$ is set for the input video signal and $\gamma=1.8$ is set for the liquid crystal display device. Considering that the input is 6 bits and the output is 8 bits, the following conversion is made:

$$(\text{Output value})=255\times((\text{input value}/63)^{2.2})^{(1/1.8)}.$$

FIG. 10 shows an LUT determined by this equation for the gamma correction device 4. The values of the LUTs shown in FIG. 9 are determined such that the values of the LUT shown in FIG. 10 are outputted as output signals.

First, the difference LUT receives high-order 5 bits of input gray scale as an input LUT value and stores, as an output LUT value, a difference between two output gray scales (that is, the two output gray scales of input gray scales having different low-order 1 bits of "0" and "1") having the same high-order 5 bits.

The high-order LUT receives the high-order 3 bits of input gray scale as an input LUT value and stores, as an output LUT value, the high-order 2 bits of output gray scale corresponding to the input gray scale having that high-order 3 bits and low-order 3 bits being "000".

The low-order LUT receives the high-order 5 bits of input gray scale as an input LUT value and stores, as an output LUT value, a value obtained by subtracting an 8-bit value, in which the output 2 bits of the high-order LUT is connected with low-order 6 bits of "000000", from an output gray scale value of input gray scale having an input value of the high-order 5 bits and low-order bits of "0". The LUT obtained thus is shown in FIG. 11.

A process for calculating and combining the output values of the LUTs will be explained below by using the specific values of FIGS. 10 and 11. It is assumed that values of 36 (binary number "100100") and 37 (binary number "100101") are inputted as an input image to the gamma correction device 4. Outputs are, as can be seen from FIG. 10, 129 (10000001) and 133 (10000101).

Both of the input values (36, 37) have high-order 5 bits of "10010" and thus the output of the low-order LUT is "65 (1000001)" according to the LUT of FIG. 11. Both of the input values have high-order 3 bits of "100" and thus the output of the high-order LUT is "1(01)" according to the LUT of FIG. 11. Similarly, the output of the difference LUT is "4(0100)".

In the following, the output of the difference LUT output setting section 5 will be explained. When the input value is "36", the lowest-order bit is "0" and thus the difference LUT output setting section 5 performs NAND and NOT on each bit of "0100" and "0000" and outputs "0(0000)". When the input value is "37", the lowest-order bit is "1" and thus the difference LUT output setting section 5 performs NAND and NOT on each bit of "0100" and "1111" and outputs "4(0100)".

The data connecting section 2 connects the output 2 bits of the high-order LUT as high-order 2 bits with the output of the LUT output setting section 5 as low-order 4 bits. The output value of the data connecting section 2 is 1×64=64 for the input of 36 (×64 means 6-bit shift of data and no logical operation is necessary) and 1×64+4=68 for the input of 37.

The adder 3 adds the output value of the data connecting section 2 and the output value of the low-order LUT. The addition result is 64+65=129 for the input value of 36 and 68+65=133 for the input value of 37.

These results are equal to the output values of the LUT shown in FIG. 10 and thus it is found that the gamma correction device 4 configured as FIG. 9 operates normally.

The LUT output setting section 5 always outputs "0" when the lowest order bit is "0", so that the circuit size is reduced. Since the output value of the high-order LUT and the output value of the difference LUT can be added without using an adder, these output values are added beforehand. Since the adder 3 does not overflow, overflow processing is not necessary.

With this configuration, the circuit size is reduced to a memory capacity of $2^5 \times 7 + 2^3 \times 2 + 2^5 \times 4 = 368$ bits, which is a reduction of about 28% from an undivided LUT of ($2^6 \times 8 = 512$ bits). The overall circuit size including the adder is reduced by 20% or more.

Further, unlike the conventional second method using only differences, the LUT is divided and the memory size is reduced without using an additional adder.

As shown in FIG. 11, since the maximum value of the difference LUT is "5", the number of output bits of the difference LUT can be set at "3" instead of "4" in this configuration to reduce the circuit size.

However, when $\gamma=1$ is set for the liquid crystal display and $\gamma=2.2$ is set for the input signal, the difference LUT requires 4 output bits. Also when the maximum difference between adjacent gray scales is "10" in brightness correction and contrast correction, the difference LUT requires 4 output bits. In this way, the number of output bits of the difference LUT is preferably set according to a correction value $\gamma$ of gamma correction in a required range and differences of brightness/contrast correction.

According to this configuration, the number of additions is reduced by connecting the high-order LUT and the difference LUT beforehand, thereby achieving a gamma correction device in which the lookup table is divided and the circuit size is reduced with a single adder, high versatility enabling a correct output value is achieved, and high-speed processing can be performed.

The gamma correction device makes it possible to achieve an image conversion apparatus or a display device with a small circuit size.

The above explanation described the example in which the input signal and the liquid crystal display have different $\gamma$ values. The present invention is not limited to this case. The present invention is also applicable to the case where the LUT of the gamma correction unit may be changed to correct contrast or brightness.

Further, in the above explanation, the number of input bits of digital gray scale is 6. Needless to say, the number of input bits is not limited to 6 and thus the same effect can be obtained by any number of bits (for example, 8 bits).

Figure 12:
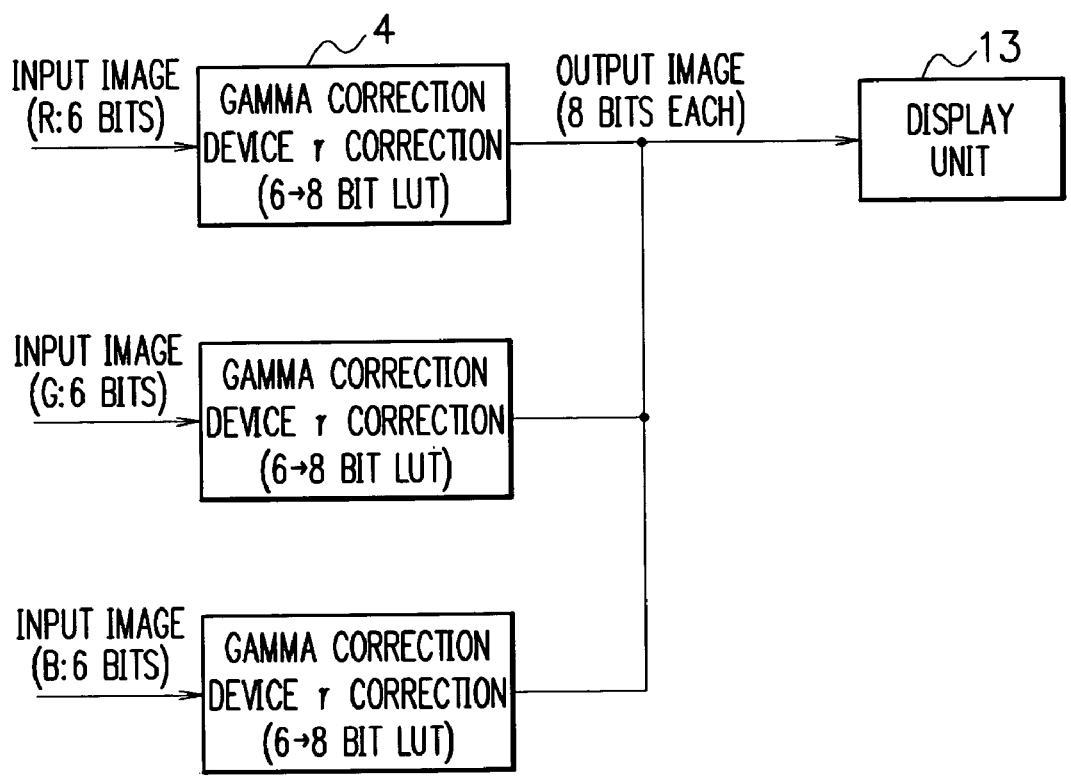
FIG. 12 is a diagram showing another structural example of the image display device according to Embodiment 1.

In the present embodiment, the liquid crystal display is used as a display device. The display device is not limited to this and thus the same effect can be obtained by other display devices as shown in FIG. 12 (for example, a PDP, a display using an electroluminescence element, and a liquid crystal projector).

Embodiment 2

The following will describe Embodiment 2 for preferably implementing the present invention.

Figure 13:
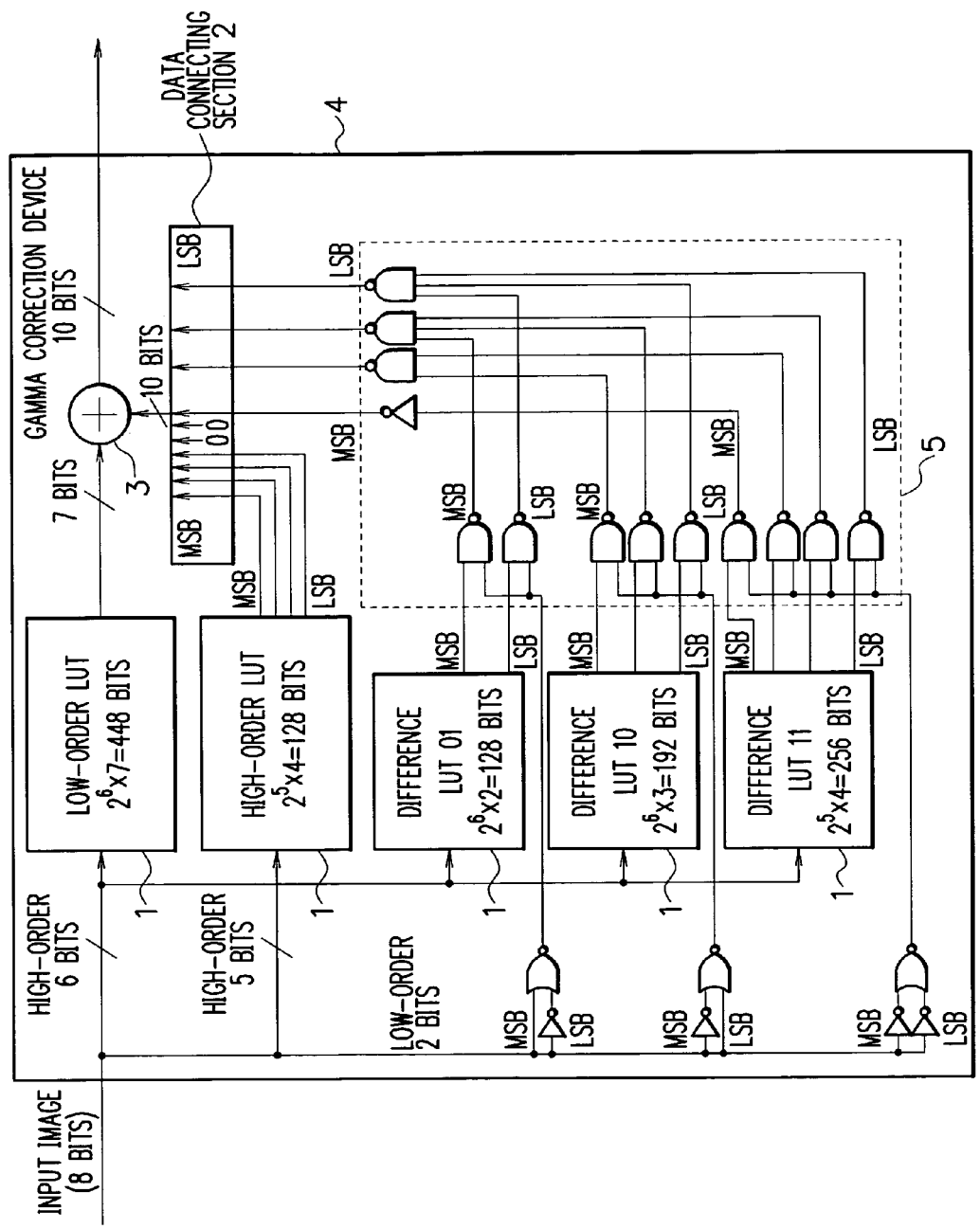
FIG. 13 is a diagram showing the configuration of a gamma correction circuit according to Embodiment 2 for preferably implementing the present invention.
Figure 14:
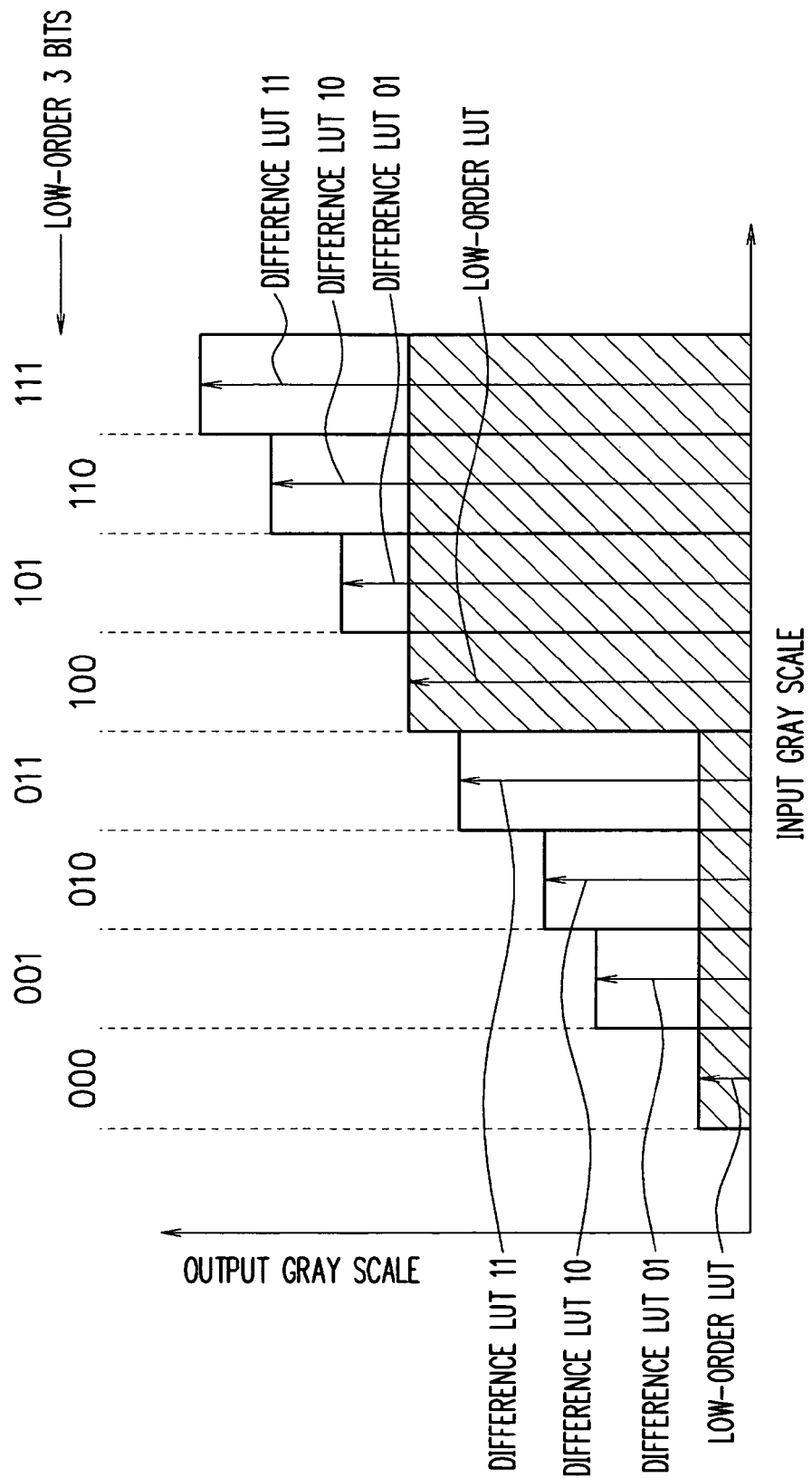
FIG. 14 is a diagram showing the relationship between the difference LUTs and the low-order LUT of the gamma correction circuit according to Embodiment 2.

FIG. 13 shows the configuration of a gamma correction device of the present embodiment. As in Embodiment 1, the gamma correction device is used for gamma correction in a liquid crystal display. The gamma correction device is different from that of Embodiment 1 in that a difference LUT is further divided into three and a difference LUT output setting section 5 is provided for performing an operation using the outputs of the difference LUTs and input of low-order 2 bits.

The difference LUT is divided in the present embodiment. Such a configuration is effective particularly when the maximum difference is small (2 bits in the present embodiment) between adjacent gray scales. Regarding the three difference LUTs shown in FIG. 13, when the high-order 6-bit input value of 8-bit input is "X5X4...X0", a difference LUT01 stores as an output value a difference when low-order 2 bits are "00" and "01", a difference LUT10 stores as an output value a difference when low-order 2 bits are "00" and "10", and a difference LUT11 stores as an output value a difference when low-order 2 bits are "00" and "11".

The difference LUT10 stores an output difference for an input difference of two gray scales and the difference LUT11 stores an output difference for an input difference of three gray scales, so that the output bits of the difference LUT10 and LUT11 are 3 and 4 bits, respectively. The difference LUT output setting section 5 outputs "0000" when low-order 2-bit input is "00", and outputs the output values of the difference LUT01, the difference LUT10 and the difference LUT11 when the low-order 2-bit input is "01", "10" and "11". A data connecting section 2 and an adder 3 operate in a similar manner to Embodiment 1.

With this configuration, the circuit size is reduced to a memory capacity of $2^6 \times 7 + 2^5 \times 4 + 2^6 \times 2 + 2^6 \times 3 + 2^6 \times 4 = 1152$ bits, which is a reduction of about 55% from an undivided LUT of ($2^8 \times 10 = 2560$ bits). The overall circuit size including the adder is reduced by about 50%.

When the difference LUT only requires a small memory capacity (a large input gray scale difference), it is effective to divide the difference LUT.

According to this configuration, the number of additions is reduced by connecting the high-order LUT and the difference LUT beforehand, thereby achieving a gamma correction device in which the lookup table is divided and the circuit size is reduced with a single adder, high versatility enabling a correct output value is achieved, and high-speed processing can be performed.

Embodiment 3

The following will describe Embodiment 3 for preferably implementing the present invention. In the above Embodiments 1 and 2, the input signal is an integer value. The present embodiment will describe an input signal in a floating-point representation.

Figure 15:
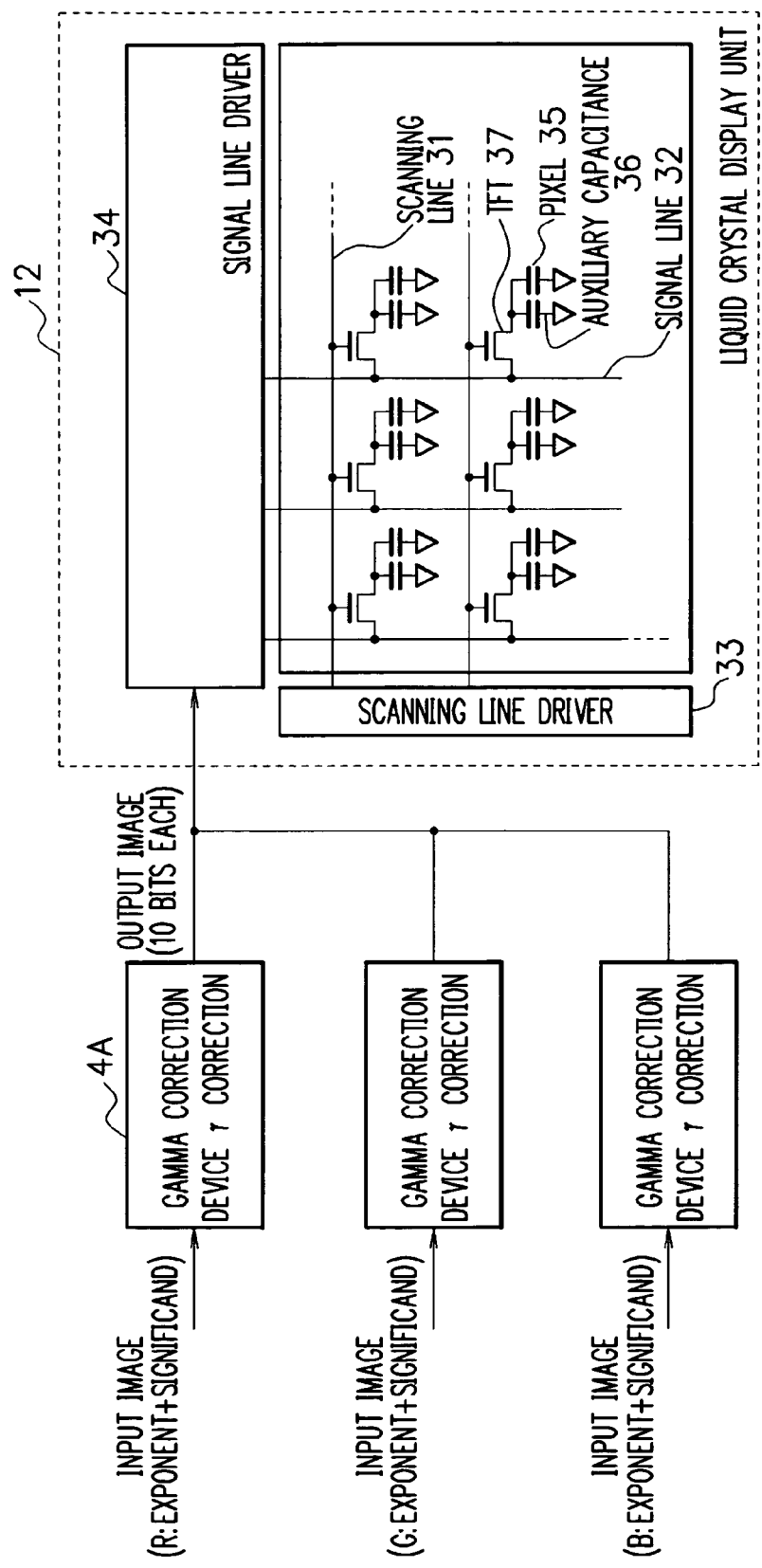
FIG. 15 is a diagram showing the configuration of an image display device according to Embodiment 3 for preferably implementing the present invention.

FIG. 15 shows the configuration of a liquid crystal display according to the present embodiment and FIG. 16 shows the configuration of a gamma correction device according to the present embodiment.

The liquid crystal display of the present embodiment is different from that of Embodiment 1 in that an input signal is represented as a floating point of an exponent part+a significand part and the signal is inputted to a gamma correction device 4A. FIG. 16 shows the configuration of the gamma correction device 4A. The gamma correction device 4A includes a plurality of gamma correctors 4, a selector 6 for selectively outputting one of the outputs of the gamma correctors 4, and a data shift section 7 for the data shift of an input signal. The gamma correctors 4 of FIG. 16 are similar in configuration to those of the above Embodiments 1 and 2 (FIGS. 9 and 13).

Since the floating-point representation has a larger difference in dynamic range than an integer representation, a lookup table almost equivalent to the dynamic range of integer output is preferable. In this case, a lookup table produced for the maximum exponent is allocated to a select signal "11". As the exponent decreases one by one, select signals "10", "01" and "00" are allocated to produced lookup tables. Thus, the lookup tables (corresponding to the gamma correctors 4) are produced so as to receive the high-order bits of the significand of respective exponents.

In the data shift section 7, the value of an exponent is adjusted so as to correspond to any of the above lookup tables, and the data of a significand is shifted to lower bits according to an adjustment value. For example, when an exponent is 7, a significand is 8192, and lookup tables with exponents of 12, 13, 14 and 15 are produced, the value of the exponent is added by 5 (7→12) and the value of the significand is shifted by 5 bits (8192→256). Then, of the gamma correctors 4, the selector 6 selects one of the values of the lookup tables based on an exponent output value from the data shift section 7 and outputs the selected value.

In the above example, the value with an exponent of 12 and a significand of 256 is outputted from the data shift section 7, inputted to each of the gamma correctors 4, and gamma-corrected therein. Since the characteristics 12, 13, 14 and 15 correspond to "00", "01", "10" and "11", respectively, "00" corresponding to the characteristic of 12 is inputted as a select signal from the data shift section 7 to the selector 6. Therefore, output corresponding to gate "00" in the gamma correction device is outputted as the output (output image) of the selector 6.

This configuration makes it possible to achieve a gamma correction device in which even when an input signal is not an integer, the circuit size can be reduced by dividing a lookup table, high versatility enabling a correct output value is achieved, and high-speed processing can be performed.

The gamma correction device makes it possible to reduce the circuit size of an image conversion apparatus and a display device.

In the above Embodiments 2 and 3, the display device is a liquid crystal display. The display device is not limited to this and thus a PDP and a display device using an organic EL are also applicable.

The foregoing embodiments are preferable examples of the present invention and thus the present invention is not limited to these embodiments. For example, the γ value and the number of input/output bits illustrated in the above embodiments are just examples and the present invention can be implemented with different values.

Hence, various modifications can be made in the present invention.

What is claimed is:

1. A gamma correction device for outputting, as an m-bit signal, a digital input signal having been inputted as an n-bit signal, m being a given number, the gamma correction device comprising a first lookup table, a second lookup table, a third lookup table, a connector and an adder, wherein each of the lookup tables has input bits fewer than n and output bits fewer than m, the first lookup table has x-bit input and m1-bit output, the second lookup table has (n−t)-bit input and m2-bit output, the third lookup table has (n−t)-bit input and k-bit output, $m \leq m1+m2$, $x < n-t$ and $m \geq m1+k$ are established, the connector outputs connection data obtained by connecting output bits of the first lookup table on a high-order bit side and output bits of the third lookup table on a low-order bit side with m−m1−k bits of "0s" being interposed between the output bits, and the adder adds the connection data and an output value of the second lookup table and outputs the added data.

2. The gamma correction device according to claim 1, wherein the device comprises the plurality of third lookup tables.

3. The gamma correction device according to claim 2, wherein the third lookup table has k output bits and k is determined based on a correction value γ of gamma correction.

4. The gamma correction device according to claim 2, wherein the third lookup table has k output bits and k is set based on a maximum difference between adjacent gray scales in brightness/contrast correction.

5. A floating-point gamma correction device for outputting an m-bit input signal made up of an exponent and a significand,
the device comprising as integer gamma correction units the plurality of gamma correction devices according to claim 2,
wherein the integer gamma correction unit has, as input, high-order n bits of the exponent, and
gamma correction with n-bit input and m-bit output is performed by selecting one of outputs of the integer gamma correction units based on a value of the significand, the selected output being determined based on a value of the exponent.

6. An image conversion apparatus, comprising the gamma correction device according to claim 2.

7. A display device, comprising the gamma correction device according to claim 2.

8. The gamma correction device according to claim 1, wherein when a relationship between n-bit input and m-bit output is set in gamma correction as a base input/output table,
an input/output table in the first lookup table sets, as an output value (as a reference value signal) for x-bit input value of IN1, high-order m1 bits of an output value corresponding to an input value having high-order x bits of IN1 and low-order n−x bits of 0 on the base input/output table,
an input/output table in the second lookup table sets, as an output value for an (n−t) bit input value of IN2, a difference between an output value corresponding to an input value having high-order n−t bits of IN2 and low-order t bits of 0 on the base input/output table and a value obtained by adding an output value corresponding to an input value having high-order x bits of IN2 and low-order bits of m−m1 "0s" on the first lookup table, and
an input/output table in the third lookup table sets, as an output value for an (n−t)-bit input value of IN3, a difference between an output value corresponding to an input value having high-order (n−t) bits of IN3 and low-order t bits other than 0 on the base input/input output table and an output value corresponding to an input value having high-order n−t bits of IN3 and low-order t bits of 0 on the base input/output table.

9. The gamma correction device according to claim 8, wherein the third lookup table has k output bits and k is determined based on a correction value γ of gamma correction.

10. The gamma correction device according to claim 8, wherein the third lookup table has k output bits and k is set based on a maximum difference between adjacent gray scales in brightness/contrast correction.

11. A floating-point gamma correction device for outputting an m-bit input signal made up of an exponent and a significand,
the device comprising as integer gamma correction units the plurality of gamma correction devices according to claim 8,
wherein the integer gamma correction unit has, as input, high-order n bits of the exponent, and
gamma correction with n-bit input and m-bit output is performed by selecting one of outputs of the integer gamma correction units based on a value of the significand, the selected output being determined based on a value of the exponent.

12. An image conversion apparatus, comprising the gamma correction device according to claim 8.

13. A display device, comprising the gamma correction device according to claim 8.

14. The gamma correction device according to claim 1, wherein the third lookup table has k output bits and k is determined based on a correction value γ of gamma correction.

15. A floating-point gamma correction device for outputting an m-bit input signal made up of an exponent and a significand,
the device comprising as integer gamma correction units the plurality of gamma correction devices according to claim 14,
wherein the integer gamma correction unit has, as input, high-order n bits of the exponent, and
gamma correction with n-bit input and m-bit output is performed by selecting one of outputs of the integer gamma correction units based on a value of the significand, the selected output being determined based on a value of the exponent.

16. An image conversion apparatus, comprising the gamma correction device according to claim 14.

17. A display device, comprising the gamma correction device according to claim 14.

18. The gamma correction device according to claim 1, wherein the third lookup table has k output bits and k is set based on a maximum difference between adjacent gray scales in brightness/contrast correction.

19. A floating-point gamma correction device for outputting an m-bit input signal made up of an exponent and a significand,
the device comprising as integer gamma correction units the plurality of gamma correction devices according to claim 18,
wherein the integer gamma correction unit has, as input, high-order n bits of the exponent, and
gamma correction with n-bit input and m-bit output is performed by selecting one of outputs of the integer gamma correction units based on a value of the significand, the selected output being determined based on a value of the exponent.

20. An image conversion apparatus, comprising the gamma correction device according to claim 18.

21. A display device, comprising the gamma correction device according to claim 18.

22. A floating-point gamma correction device for outputting an m-bit input signal made up of an exponent and a significand,
the device comprising as integer gamma correction units the plurality of gamma correction devices according to claim 1,
wherein the integer gamma correction unit has, as input, high-order n bits of the exponent, and
gamma correction with n-bit input and m-bit output is performed by selecting one of outputs of the integer gamma correction units based on a value of the significand, the selected output being determined based on a value of the exponent.

23. An image conversion apparatus, comprising the floating-point gamma correction device according to claim 22.

24. A display device, comprising the floating-point gamma correction device according to claim 22.

25. An image conversion apparatus, comprising the gamma correction device according to claim 1.

26. A display device, comprising the gamma correction device according to claim 1.

* * * * *

UNITED STATES PATENT AND TRADEMARK OFFICE
CERTIFICATE OF CORRECTION

PATENT NO. : 7,612,831 B2
APPLICATION NO. : 11/378478
DATED : November 3, 2009
INVENTOR(S) : Daigo Miyasaka It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 898 days.

Signed and Sealed this

Nineteenth Day of October, 2010

David J. Kappos
*Director of the United States Patent and Trademark Office*